(12) United States Patent
Wood

(10) Patent No.: US 11,879,526 B2
(45) Date of Patent: Jan. 23, 2024

(54) TRANSMISSION WITH ALTERNATING ROTARY DISKS

(71) Applicant: Terry Gordon Wood, Visalia, CA (US)

(72) Inventor: Terry Gordon Wood, Visalia, CA (US)

(*) Notice: Subject to any disclaimer, the term of this patent is extended or adjusted under 35 U.S.C. 154(b) by 0 days.

(21) Appl. No.: 17/697,440

(22) Filed: Mar. 17, 2022

(65) Prior Publication Data

US 2022/0299089 A1    Sep. 22, 2022

Related U.S. Application Data

(60) Provisional application No. 63/162,113, filed on Mar. 17, 2021.

(51) Int. Cl.
*F16H 13/02* (2006.01)
*F16H 3/087* (2006.01)
*F16H 1/22* (2006.01)

(52) U.S. Cl.
CPC .............. *F16H 3/087* (2013.01); *F16H 1/22* (2013.01); *F16H 13/02* (2013.01)

(58) Field of Classification Search
CPC . F16H 1/22; F16H 3/087; F16H 13/02; B07B 1/08
USPC ............................................ 74/70, 318, 319
See application file for complete search history.

(56) References Cited

U.S. PATENT DOCUMENTS

| 2,860,713 | A | * | 11/1958 | Peterson | B64D 35/00 416/169 R |
| 3,807,662 | A | * | 4/1974 | Velazquez | B64C 27/82 244/17.19 |
| 8,333,673 | B2 | | 12/2012 | Hanafusa | |
| 8,926,467 | B2 | | 1/2015 | Grant | |
| 11,161,606 | B2 | * | 11/2021 | Olson | B64C 29/02 |
| 2004/0102274 | A1 | * | 5/2004 | Tesar | F16H 1/32 475/168 |
| 2015/0125299 | A1 | * | 5/2015 | Baskin | B64D 35/04 416/128 |
| 2021/0291972 | A1 | * | 9/2021 | Gmirya | B64C 27/10 |

FOREIGN PATENT DOCUMENTS

| EP | 0314463 | A2 | 5/1989 |
| EP | 0138449 | B1 | 7/1991 |

* cited by examiner

*Primary Examiner* — William C Joyce

(57) ABSTRACT

A transmission with alternating rotary disks contains a plurality of first rotary disk assemblies, a plurality of second rotary disk assemblies, a drive shaft, and a gearbox shell. The plurality of first rotary disk assemblies is rotatably connected to the plurality of second rotary disk assemblies, where the plurality of first rotary disk assemblies and the second plurality of disk assemblies are arranged in a specified pattern. The first rotary disk assembly contains a first rotary element that rotates in one direction when the drive shaft is subjected to torque. The second rotary disk assembly contains a second rotary element that rotates in the opposite direction, relative to the first rotary element rotation.

16 Claims, 6 Drawing Sheets

US 11,879,526 B2

TRANSMISSION WITH ALTERNATING ROTARY DISKS

FIELD OF THE INVENTION

The present invention relates to transmission devices. More specifically, the present invention relates to transmission devices with alternating rotary disks suitable for a variety of applications.

BACKGROUND OF THE INVENTION

A transmission is a machine in a power transmission system, which provides controlled application of power. Often the term five-speed transmission refers simply to the gearbox, that uses gears and gear trains to provide speed and torque block conversions from a rotating power source to another device. The term transmission properly refers to the whole drivetrain, including clutch, gearbox, prop shaft (for rear-wheel drive vehicles), differential, and final drive shafts. In the United States the term is sometimes used in casual speech to refer more specifically to the gearbox alone, and detailed usage differs. The most common use is in motor vehicles, where the transmission adapts the output of the internal combustion engine to the drive wheels. Such engines need to operate at a relatively high rotational speed, which is inappropriate for starting, stopping, and slower travel. The transmission reduces the higher engine speed to the slower wheel speed, increasing torque in the process. Transmissions are also used on pedal bicycles, fixed machines, and where different rotational speeds and torques are adapted. Conventional transmissions oftentimes contain a shaft output, but there are some fixed machines that require a shaftless transmission device with alternative rotary disks, therefore it is an objective of the present invention to address these demands.

The present invention features multiple rotary disk assemblies that operate under a single drive shaft. Each rotary disk assembly contains a rotary disk element with a central aperture that serves as a utility chamber. In this chamber, inserts, such as, but not limited to screens, fans, filters, or any other insert can be placed to suit a variety of applications. Additionally, the rotary disks may rotate in a continuous alternating pattern, such that a set of rotary disks rotates clockwise, while the another set of rotary disks rotates counterclockwise. These alternating rotations are suitable for a variety of applications, working in conjunction with the inserts. In one instance, the rotary disks may be outfitted with sifting screens suitable for processing varied particulate mixes. In another instance, the rotary disks may be outfitted with fans suitable for carbon dioxide capturing methods.

SUMMARY OF THE INVENTION

The present invention is a transmission apparatus. More specifically, the present invention is a shaftless transmission with rotary disks that rotate in alternating directions. The transmission apparatus comprises a roller housing, a first rotary disk assembly, a drive shaft, and a plurality of mounting shafts. The roller housing comprises a drive aperture. The first rotary disk assembly comprises a first rotary element, a plurality of first mounting rollers, and a first rotary driver. The drive aperture traverses through the roller housing. The first rotary disk assembly is positioned within the roller housing. The plurality of mounting shafts is radially distributed about the first rotary disk. The plurality of mounting shafts is connected within the roller housing. The plurality of first mounting rollers is rotatably connected to the plurality of mounting shafts. The plurality of first mounting rollers is rotatably engaged about the first rotary element. The drive shaft is rotatably connected to the drive aperture. The drive shaft traverses into the roller housing. The first rotary driver is torsionally connected to the drive shaft. The first rotary driver is rotatably engaged to the first rotary element.

In the preferred embodiment, the roller housing takes the form of any suitable gearbox shell chassis suitable for securing the components the constitutes the transmission apparatus. In the preferred embodiment, the roller housing is made out of any suitable material, such as, but not limited to aluminum, polymer, steel, or any other suitable material. In the preferred embodiment, the first rotary disk assembly takes the form of a rotary module that engages the rotating drive shaft such that the first rotary disk rotates in the opposite direction of the drive shaft rotation. More specifically, the first rotary drive engages the first rotary element such that the first rotary element is rolling along the first rotary drive. In one instance, the drive shaft turning clockwise will result in the first rotary element to turn counterclockwise. In another instance, the draft shaft turning counterclockwise will result in the first rotary element to turn clockwise. In the preferred embodiment, the plurality of first mounting rollers serves as roller mounts that supports the first rotary element within the roller housing, working in conjunction with the plurality of mounting shafts. In the preferred embodiment, the components the constitutes the first rotary disk assembly takes the form of rollers but may take the form of any other suitable rotary element, such as, but not limited to gear elements, belt and pulley elements, or any other suitable rotary element. In the preferred embodiment, the drive aperture takes the form of a through hole that enables the drive shaft to pass through the roller housing such that the drive shaft can facilitate the connection to a motor, hand crank, or any other suitable rotary driver. In the preferred embodiment, the drive shaft takes the form of any suitable shaft that transmits rotational torque produced from a motor or any other suitable device, to the first rotary driver. In the preferred embodiment, the plurality of mounting shafts takes the form of any suitable mounting implement to rotatably connect and position the plurality of first mounting rollers to the first rotary disk.

The transmission apparatus further comprises a reversal shaft and a second rotary disk assembly. The second rotary disk assembly comprises a second rotary element, a reversal rotary element, a plurality of second mounting rollers, and a second rotary driver. The second rotary disk assembly is positioned within the roller housing. The second rotary disk assembly is positioned adjacent to the first rotary disk assembly. The plurality of mounting shafts is radially distributed about the second rotary disk. The plurality of second mounting rollers is rotatably connected to the plurality of mounting shafts. The plurality of second mounting rollers is rotatably engaged about the second rotary element. The reversal rotary element is rotatably engaged to the second rotary element, where the reversal rotary element is configured to reverse the direction of rotation of the second rotary element relative to the direction of rotation of the first rotary element. The reversal shaft is connected within the roller housing. The reversal rotary element is rotatably connected to the reversal shaft. The second rotary driver is rotatably engaged to the reversal rotary element. The second rotary driver is torsionally connected to the drive shaft. In the preferred embodiment, the reversal shaft takes the form of any suitable mounting shaft that rotatably connects and positions the reversal rotary element along the second rotary element. In the preferred embodiment, the second rotary disk assembly takes the form of a rotary module that engages the rotating drive shaft such that the second rotary disk rotates in the same direction of the drive shaft rotation, or in the opposite direction of the first rotary disk assembly. More specifically, the second rotary driver engages the reversal rotary element, where the reversal rotary element engages the second rotary element such that the reversal rotary element rotates the second rotary element in the opposite direction relative to the first rotary element. In the preferred embodiment, the components the constitutes the second rotary disk assembly takes the form of rollers but may take the form of any other suitable rotary element, such as, but not limited to gear elements, belt and pulley elements, or any other suitable rotary element.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

Figure 1:
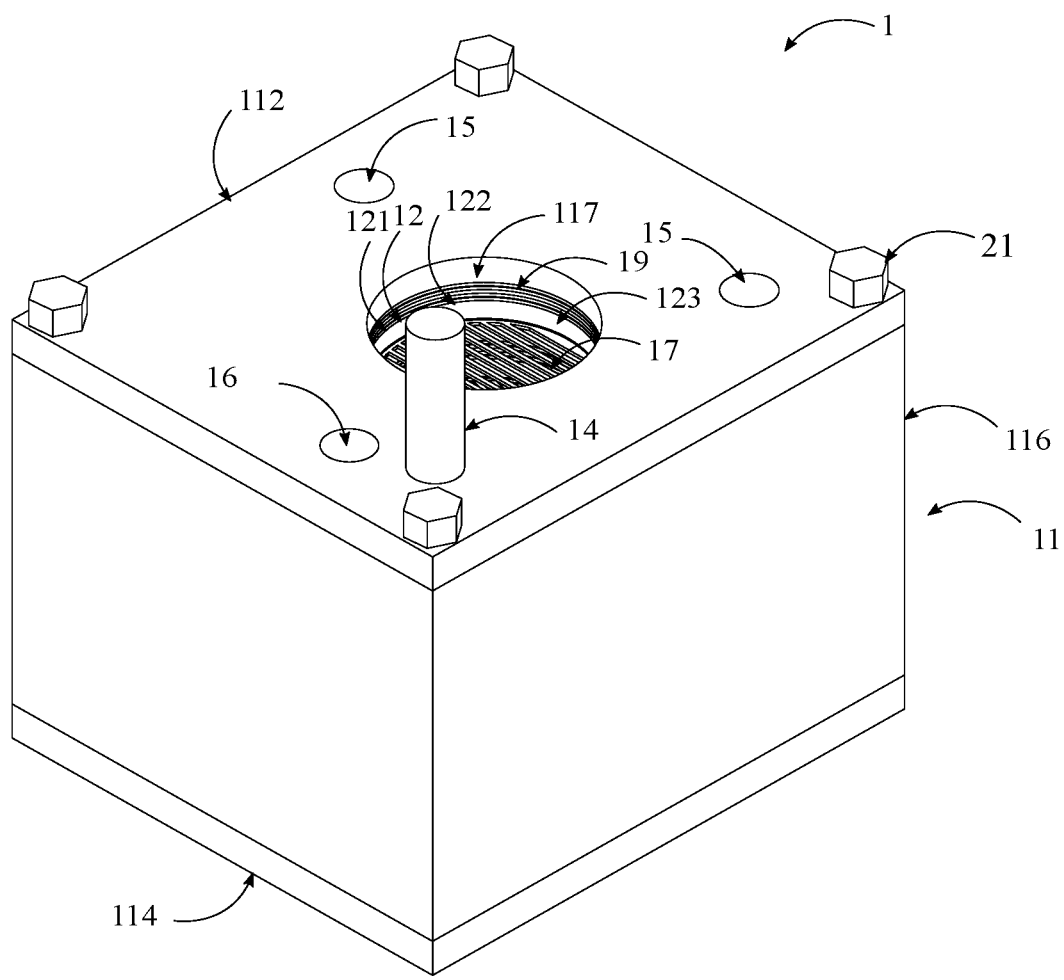
FIG. 1 is a top perspective view of the present invention.
Figure 2:
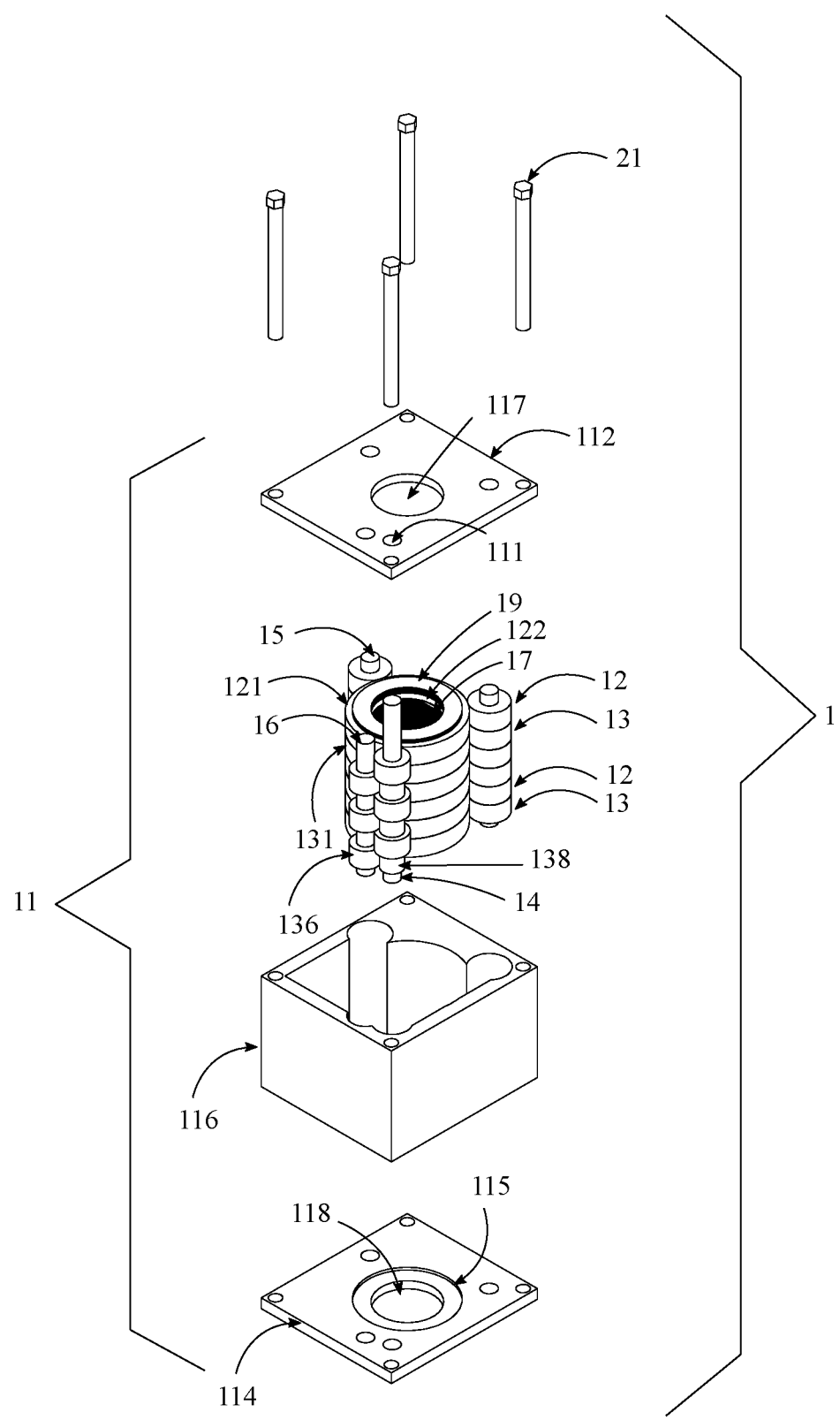
FIG. 2 is a top perspective exploded view of the present invention.
Figure 3:
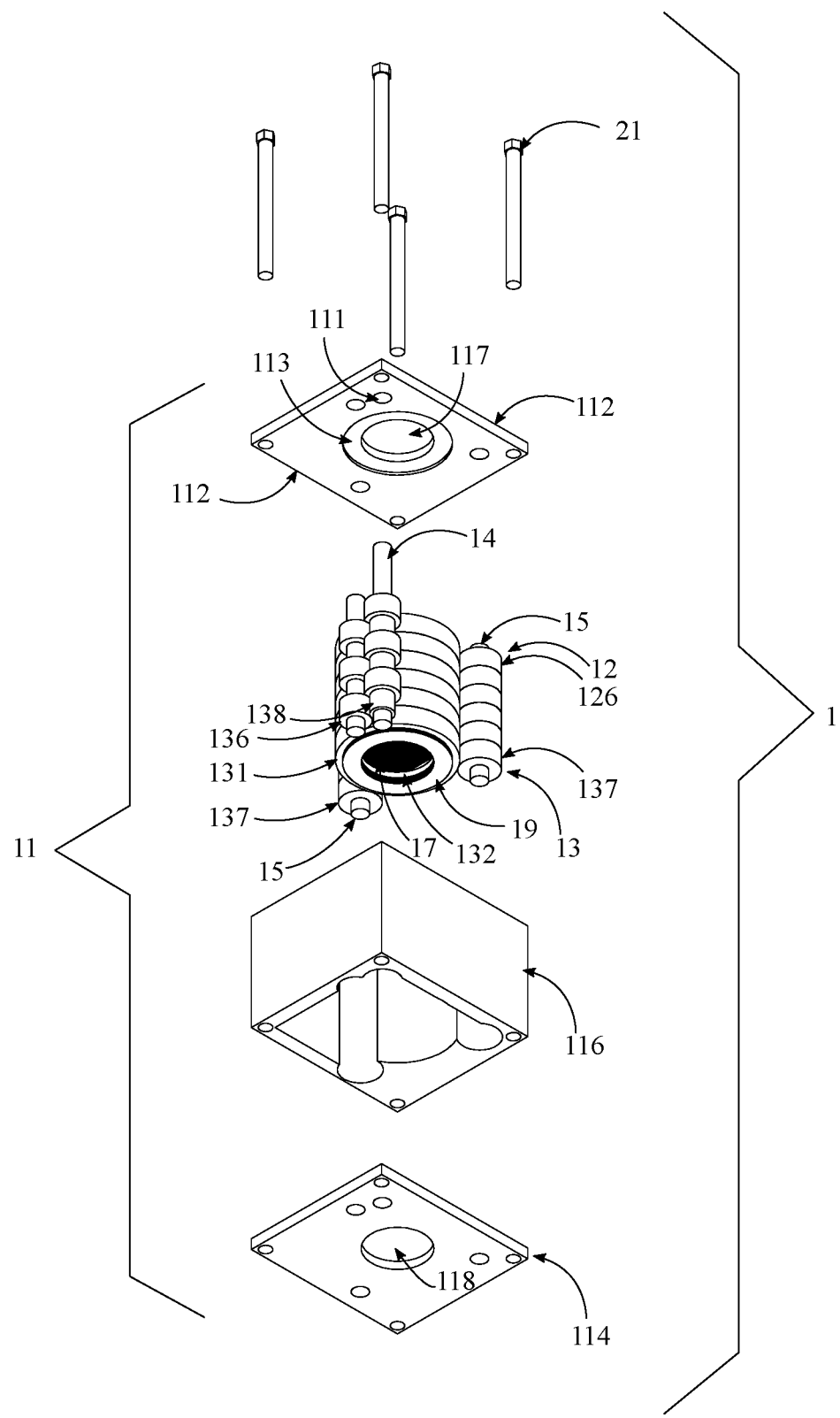
FIG. 3 is a bottom perspective exploded view of the present invention.
Figure 4:
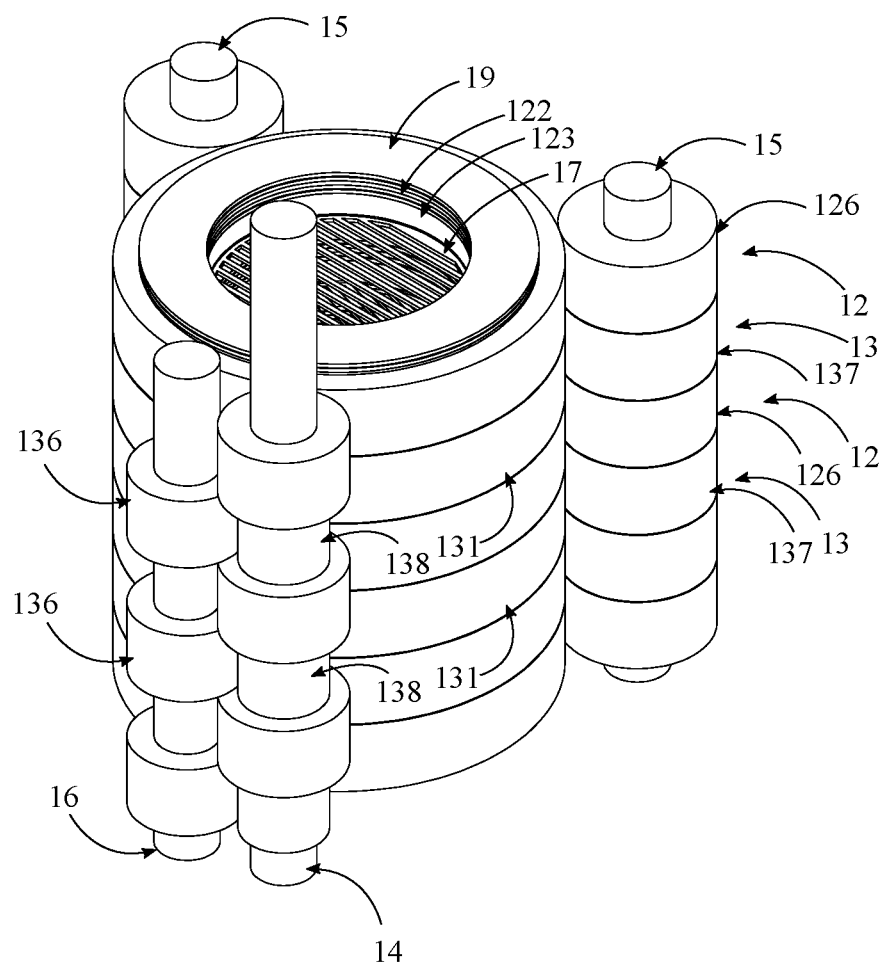
FIG. 4 is a top perspective view of the present invention that shows a stack of rotary disk assemblies.
Figure 5:
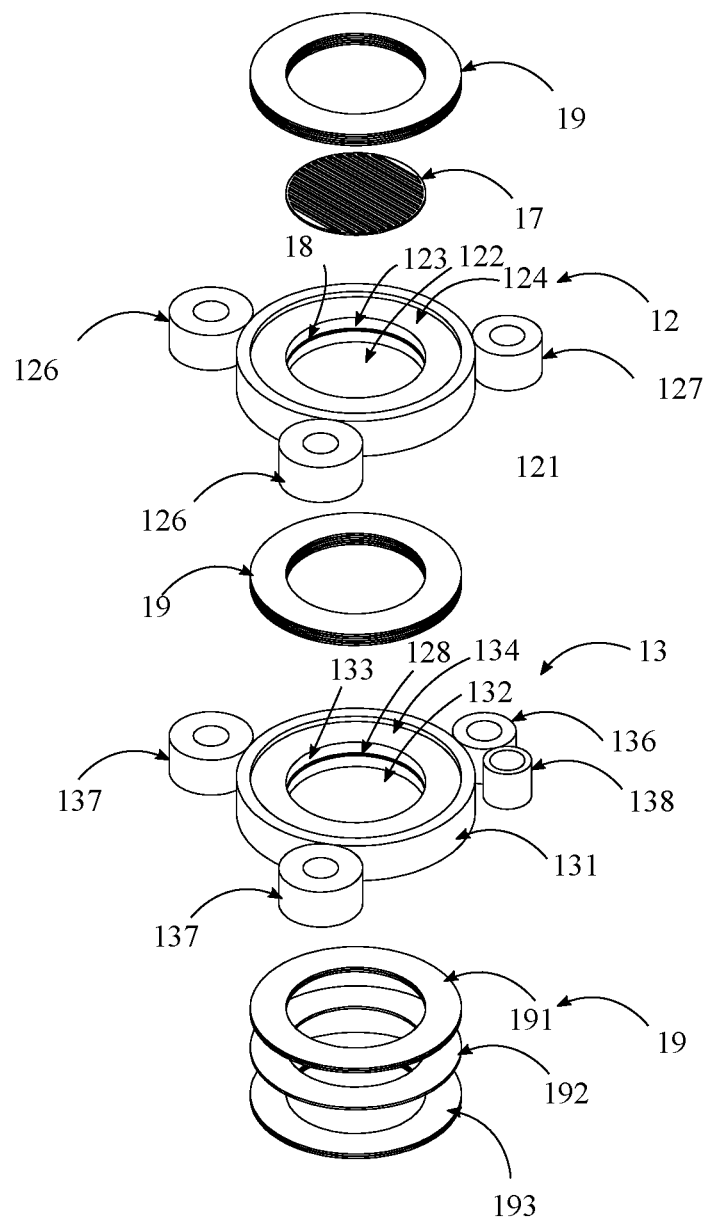
FIG. 5 is a top exploded view of the present invention that shows the stack of rotary disk assemblies.
Figure 6:
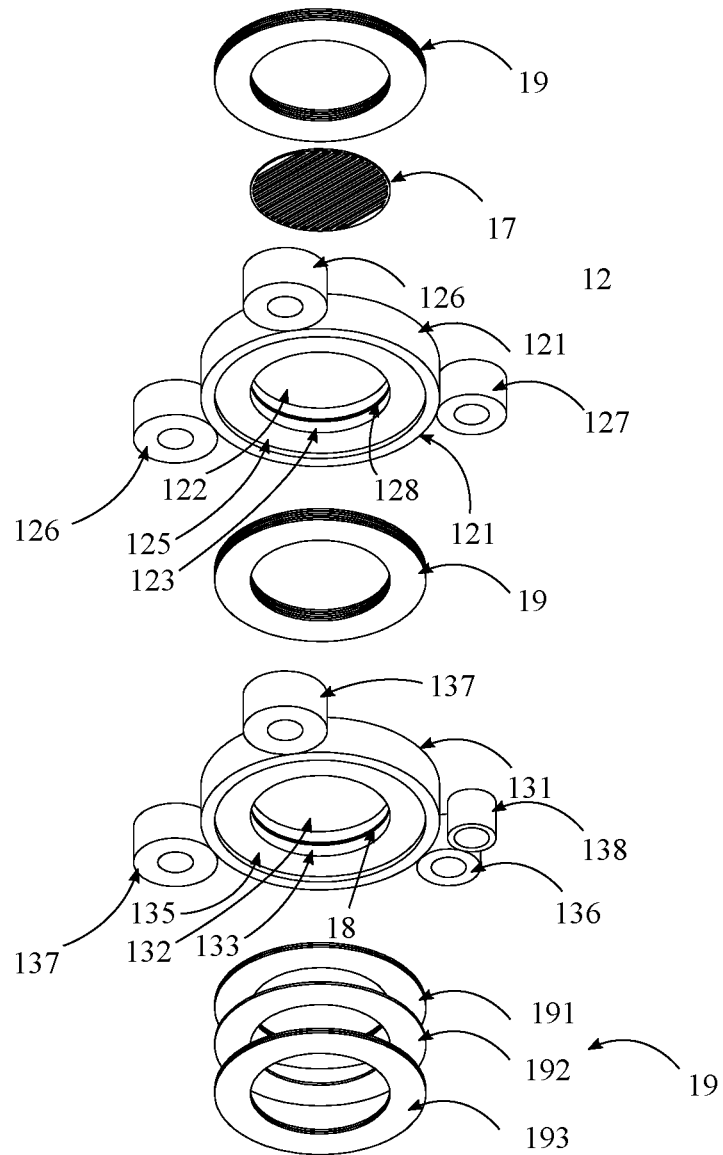
FIG. 6 is a bottom exploded view of the present invention that shows the stack of rotary disk assemblies.

In reference to FIGS. 1-3, the present invention is a transmission apparatus 1. More specifically, the present invention is a shaftless transmission with rotary disks that rotate in alternating directions. In reference to FIGS. 1-6, the transmission apparatus 1 comprises a roller housing 11, a first rotary disk assembly 12, a drive shaft 14, and a plurality of mounting shafts 15. In reference to FIGS. 2-3, the roller housing 11 comprises a drive aperture 111. In reference to FIGS. 1-6, the first rotary disk assembly 12 comprises a first rotary element 121, a plurality of first mounting rollers 126, and a first rotary driver 127. The drive aperture 111 traverses through the roller housing 11. The first rotary disk assembly 12 is positioned within the roller housing 11. The plurality of mounting shafts 15 is radially distributed about the first rotary disk. The plurality of mounting shafts 15 is connected within the roller housing 11. The plurality of first mounting rollers 126 is rotatably connected to the plurality of mounting shafts 15. The plurality of first mounting rollers 126 is rotatably engaged about the first rotary element 121. The drive shaft 14 is rotatably connected to the drive aperture 111. The drive shaft 14 traverses into the roller housing 11. The first rotary driver 127 is torsionally connected to the drive shaft 14. The first rotary driver 127 is rotatably engaged to the first rotary element 121.

In the preferred embodiment, the roller housing 11 takes the form of any suitable gearbox shell chassis suitable for securing the components the constitutes the transmission apparatus 1. In the preferred embodiment, the roller housing 11 is made out of any suitable material, such as, but not limited to aluminum, polymer, steel, or any other suitable material. In the preferred embodiment, the first rotary disk assembly 12 takes the form of a rotary module that engages the rotating drive shaft 14 such that the first rotary disk rotates in the opposite direction of the drive shaft 14 rotation. More specifically, the first rotary drive engages the first rotary element 121 such that the first rotary element 121 is rolling along the first rotary drive. In one instance, the drive shaft 14 turning clockwise will result in the first rotary element 121 to turn counterclockwise. In another instance, the draft shaft turning counterclockwise will result in the first rotary element 121 to turn clockwise. In the preferred embodiment, the plurality of first mounting rollers 126 serves as roller mounts that supports the first rotary element 121 within the roller housing 11, working in conjunction with the plurality of mounting shafts 15. In the preferred embodiment, the components the constitutes the first rotary disk assembly 12 takes the form of rollers but may take the form of any other suitable rotary element, such as, but not limited to gear elements, belt and pulley elements, or any other suitable rotary element. In the preferred embodiment, the drive aperture 111 takes the form of a through hole that enables the drive shaft 14 to pass through the roller housing 11 such that the drive shaft 14 can facilitate the connection to a motor, hand crank, or any other suitable rotary driver. In the preferred embodiment, the drive shaft 14 takes the form of any suitable shaft that transmits rotational torque produced from a motor or any other suitable device, to the first rotary driver 127. In the preferred embodiment, the plurality of mounting shafts 15 takes the form of any suitable mounting implement to rotatably connect and position the plurality of first mounting rollers 126 to the first rotary disk.

In reference to FIGS. 1-6, the transmission apparatus 1 further comprises a reversal shaft 16 and a second rotary disk assembly 13. The second rotary disk assembly 13 comprises a second rotary element 131, a reversal rotary element 136, a plurality of second mounting rollers 137, and a second rotary driver 138. The second rotary disk assembly 13 is positioned within the roller housing 11. The second rotary disk assembly 13 is positioned adjacent to the first rotary disk assembly 12. The plurality of mounting shafts 15 is radially distributed about the second rotary disk. The plurality of second mounting rollers 137 is rotatably connected to the plurality of mounting shafts 15. The plurality of second mounting rollers 137 is rotatably engaged about the second rotary element 131. The reversal rotary element 136 is rotatably engaged to the second rotary element 131, where the reversal rotary element 136 is configured to reverse the direction of rotation of the second rotary element 131 relative to the direction of rotation of the first rotary element 121. The reversal shaft 16 is connected within the roller housing 11. The reversal rotary element 136 is rotatably connected to the reversal shaft 16. The second rotary driver 138 is rotatably engaged to the reversal rotary element 136. The second rotary driver 138 is torsionally connected to the drive shaft 14. In the preferred embodiment, the reversal shaft 16 takes the form of any suitable mounting shaft that rotatably connects and positions the reversal rotary element 136 along the second rotary element 131. In the preferred embodiment, the second rotary disk assembly 13 takes the form of a rotary module that engages the rotating drive shaft 14 such that the second rotary disk rotates in the same direction of the drive shaft 14 rotation, or in the opposite direction of the first rotary disk assembly 12. More specifically, the second rotary driver 138 engages the reversal rotary element 136, where the reversal rotary element 136 engages the second rotary element 131 such that the reversal rotary element 136 rotates the second rotary element 131 in the opposite direction relative to the first rotary element 121. In the preferred embodiment, the components the constitutes the second rotary disk assembly 13 takes the form of rollers but may take the form of any other suitable rotary element, such as, but not limited to gear elements, belt and pulley elements, or any other suitable rotary element.

In reference to FIGS. 1-6, the first rotary element 121 comprises a first rotary aperture 122 and a first mounting surface 123. The first rotary aperture 122 traverses through the first rotary element 121. The first mounting surface 123 is peripherally positioned along the first rotary aperture 122. The second rotary element 131 comprises a second rotary aperture 132 and a second mounting surface 133. The second rotary aperture 132 traverses through the second rotary element 131. The second mounting surface 133 is peripherally positioned along the second rotary aperture 132. In reference to FIGS. 1-6, the transmission apparatus 1 further comprises a rotary insert 17. The rotary insert 17 is connected along the first mounting surface 123 through a mounting element 18, shown in FIGS. 5-6. The rotary insert 17 is connected along the second mounting surface 133 through the mounting element 18. In reference to FIGS. 2-3, the roller housing 11 further comprises a first chamber aperture 117 and a second chamber aperture 118. The first chamber aperture 117 traverses from the roller housing 11 to the first rotary aperture 122. The first chamber aperture 117 is concentrically aligned with the first rotary aperture 122. The second chamber aperture 118 traverses from the roller housing 11 to the second rotary aperture 132. The second chamber aperture 118 is concentrically aligned with the second rotary aperture 132. In the preferred embodiment, the first rotary aperture 122 and the second rotary aperture 132 takes the form of respective rotary chambers of the first rotary element 121 and the second rotary element 131. In the preferred embodiment, the first chamber aperture 117 and the second chamber aperture 118 serve as access openings along the roller housing 11 that allows access to the first rotary aperture 122 and second rotary aperture 132. In the preferred embodiment, the first mounting surface 123 and the second mounting surface 133 serves as the inner walls of first rotary element 121 and the second rotary element 131 that connects the rotary insert 17 along the first rotary aperture 122 or second rotary aperture 132 portions. In the preferred embodiment, the mounting element 18 takes the form of any suitable mounting element 18 that secures the rotary insert 17s along the first mounting surface 123 or the second mounting surface 133. In the preferred embodiment, the mounting element 18 takes the form of a mounting channel but may take the form of any other suitable mounting implement such as, but not limited to stepped platforms, clasp connectors, or any other suitable mounting implement. In various embodiments, the rotary insert 17 takes the form of any suitable rotary tool insert that caters to various applications. In one instance, the rotary insert 17 takes the form of a screen sift that mount along the first mounting surface 123 or the second mounting surface 133 through the mounting element 18. In the same instance, the rotary insert 17 may take the form of a counter-weight, where a screen sift is mounted along the first mounting surface 123 and a counter weight is mounted along the second mounting surface 133. In this instance, the transmission apparatus 1 serves as a media sifter, where the screen sift rotates along the first rotary element 121 allowing sift media to move around the screen sift. The counterweight rotates along the second rotary element 131, where the counterweight is configured to act as a vibration unit, further agitating the sift media to process along the screen sift. In another instance, the rotary insert 17 may take the form of fans suitable for carbon dioxide capturing systems.

In reference to FIGS. 1-6, the transmission apparatus 1 further comprises a plurality of roller spacers 19. The first rotary element 121 is rotatably connected to the roller housing 11 through one of the plurality of roller spacers 19. The second rotary element 131 is rotatably connected to the first rotary element 121 through the one of the plurality of roller spacers 19. In reference to FIGS. 5-6, each the plurality of roller spacers 19 comprises a first bearing 191, a spacer 192, and a second bearing 193. The spacer 192 is torsionally connected between the first bearing 191 and the second bearing 193. In the preferred embodiment, the plurality of roller spacers 19 serves as roller buffers that spaces the first rotary element 121 from the second rotary element 131 such that the alternating rotary elements do not grind or rub against each other. In the preferred embodiment, the first bearing 191 and the second bearing 193 takes the form of a set of thrust bearings. In the preferred embodiment, the spacer 192 takes the form of a washer.

In reference to FIGS. 1-3, the roller housing 11 comprises a first guide plate 112, a second guide plate 114, and a gearbox enclosure 116. In reference to FIGS. 5-6, the first rotary element 121 comprises a first connection cavity 124 and a second connection cavity 125. In reference to FIGS. 5-6, the second rotary element 131 comprises a third connection cavity 134 and a fourth connection cavity 135. In reference to FIG. 3, the first guide plate 112 comprises a fifth connection cavity 113. In reference to FIG. 2, the second guide plate 114 comprises a sixth connection cavity 115. The first connection cavity 124 traverses into the first rotary element 121. The second connection cavity 125 traverses into the first rotary element 121, opposite to the first connection cavity 124. The third connection cavity 134 traverses into the second rotary element 131. The fourth connection cavity 135 traverses into the second rotary element 131, opposite to the third connection cavity 134. The fifth connection cavity 113 traverses into the first guide plate 112. The sixth connection cavity 115 traverses into the second guide plate 114. One of the plurality of roller spacers 19 is connected between the first connection cavity 124 and the fifth connection cavity 113. One of the plurality of roller spacers 19 is connected between the second connection cavity 125 and the third connection cavity 134. One of the plurality of roller spacers 19 is connected between the fourth connection cavity 135 and the sixth connection cavity 115. The first rotary disk assembly 12 and the second rotary disk assembly 13 is positioned within the enclosure. The first guide plate 112 and the second guide plate 114 are terminally connected opposite to each other along the enclosure through a plurality of fasteners 21, as shown in FIGS. 1-3. In the preferred embodiment, the first guide plate 112 and the second guide plate 114 take the form of end plates of the roller housing 11 the supports the components that constitutes the transmission apparatus 1. In the preferred embodiment, the gearbox enclosure 116 serves as the gearbox chassis that houses the components the constitutes the roller housing 11. In the preferred embodiment, the first connection cavity 124, the second connection cavity 125, the third connection cavity 134, the fourth connection cavity 135, the fifth connection cavity 113, and the sixth connection cavity 115 serve as receiving cavities to connect the plurality of roller spacers 19 between the first guide plate 112 to the first rotary element 121, the first rotary element 121 to the second rotary element 131, and the second rotary element 131 to the second guide plate 114. In the preferred embodiment, the plurality of fasteners 21 takes the form of any suitable fastening implement that fastens the first guide plate 112 to the gearbox enclosure 116 and the second guide plate 114. In the preferred embodiment, the plurality of fastener takes the form of bolt fasteners but may take the form of any other suitable fastener.

In the preferred embodiment, the first rotary disk assembly 12 is a plurality of first rotary disk assemblies. The second rotary disk assembly 13 is a plurality of second rotary disk assemblies. The plurality of first disk assemblies is rotatably connected to the plurality of second rotary disk assemblies. In the preferred embodiment, the plurality of first disk assemblies and the plurality of second disk assemblies are rotatably connected in an alternating pattern but may take the form of any combination of patterns.

Although the invention has been explained in relation to its preferred embodiment, it is to be understood that many other possible modifications and variations can be made without departing from the spirit and scope of the invention as hereinafter claimed.

What is claimed is:

1. A transmission with alternating rotary disks comprising:
    a roller housing;
    a first rotary disk assembly;
    a drive shaft;
    a plurality of mounting shafts;
    a reversal shaft;
    a second rotary disk assembly;
    a plurality of roller spacers;
    the roller housing comprising a drive aperture;
    the first rotary disk assembly comprising a first rotary element, a plurality of first mounting rollers, and a first rotary driver;
    the drive aperture traversing through the roller housing;
    the first rotary disk assembly being positioned within the roller housing;
    the plurality of mounting shafts being radially distributed about the first rotary disk;
    the plurality of mounting shafts being connected within the roller housing;
    the plurality of first mounting rollers being rotatably connected to the plurality of mounting shafts;
    the plurality of first mounting rollers being rotatably engaged about the first rotary element;
    the drive shaft being rotatably connected to the drive aperture;
    the drive shaft traversing into the roller housing;
    the first rotary driver being torsionally connected to the drive shaft;
    the first rotary driver being rotatably engaged to the first rotary element;
    the second rotary disk assembly comprising a second rotary element, a reversal rotary element, plurality of second mounting rollers, and a second rotary driver;
    the second rotary disk assembly being positioned within the roller housing;
    the second rotary disk assembly being positioned adjacent to the first rotary disk assembly;
    the plurality of mounting shafts being radially distributed about the second rotary disk;
    the plurality of second mounting rollers being rotatably connected to the plurality of mounting shafts;
    the plurality of second mounting rollers being rotatably engaged about the second rotary element;
    the reversal rotary element being rotatably engaged to the second rotary element, wherein the reversal rotary element is configured to reverse the direction of rotation of the second rotary element relative to the direction of rotation of the first rotary disk assembly;
    the reversal shaft being connected within the roller housing;
    the reversal rotary element being rotatably connected to the reversal shaft;
    the second rotary driver being rotatably engaged to the reversal rotary element;
    the second rotary driver being torsionally connected to the drive shaft
    the first rotary element being rotatably connected to the roller housing through one of the plurality of roller spacers;
    the second rotary element being rotatably connected to the first rotary element through the one of the plurality of roller spacers;
    the roller housing comprising a first guide plate, a second guide plate, and a gearbox enclosure;
    the first rotary element comprising a first connection cavity and a second connection cavity;
    the second rotary element comprising a third connection cavity and a fourth connection cavity;
    the first guide plate comprising a fifth connection cavity;
    the second guide plate comprising a sixth connection cavity;
    the first connection cavity traversing into the first rotary element;
    the second connection cavity traversing into the first rotary element, opposite to the first connection cavity;
    the third connection cavity traversing into the second rotary element;
    the fourth connection cavity traversing into the second rotary element, opposite to the third connection cavity;
    the fifth connection cavity traversing into the first guide plate;
    the sixth connection cavity traversing into the second guide plate;
    one of the plurality of roller spacers being connected between the first connection cavity and the fifth connection cavity;
    one of the plurality of roller spacers being connected between the second connection cavity and the third connection cavity;
    one of the plurality of roller spacers being connected between the fourth connection cavity and the sixth connection cavity;
    the first rotary disk assembly and the second rotary disk assembly being positioned within the enclosure; and
    the first guide plate and the second guide plate being terminally connected opposite to each other along the enclosure through a plurality of fasteners.

2. The transmission with alternating rotary disks as claimed in claim 1 comprising:

the first rotary element comprising a first rotary aperture and a first mounting surface; and
the first rotary aperture traversing through the first rotary element; and
the first mounting surface being peripherally positioned along the first rotary aperture.

3. The transmission with alternating rotary disks as claimed in claim 2 comprising:
the roller housing comprising a first chamber aperture;
the first chamber aperture traversing from the roller housing to the first rotary aperture; and
the first chamber aperture being concentrically aligned with the first rotary aperture.

4. The transmission with alternating rotary disks as claimed in claim 3 comprising:
the roller housing comprising a second chamber aperture;
the second chamber aperture traversing from the roller housing to the second rotary aperture; and
the second chamber aperture being concentrically aligned with the second rotary aperture.

5. The transmission with alternating rotary disks as claimed in claim 2 comprising:
the second rotary element comprising a second rotary aperture and a second mounting surface; and
the second rotary aperture traversing through the second rotary element; and
the second mounting surface being peripherally positioned along the second rotary aperture.

6. The transmission with alternating rotary disks as claimed in claim 5 comprising:
a rotary insert; and
the rotary insert being connected along the second mounting surface through a mounting element.

7. The transmission with alternating rotary disks as claimed in claim 2 comprising:
a rotary insert; and
the rotary insert being connected along the first mounting surface through a mounting element.

8. The transmission with alternating rotary disks as claimed in claim 1 comprising:
each the plurality of roller spacers comprising a first bearing, a spacer, and a second bearing; and
the spacer being torsionally connected between the first bearing and the second bearing.

9. The transmission with alternating rotary disks as claimed in claim 1 comprising:
the first rotary disk assembly being a plurality of first rotary disk assemblies;
the second rotary disk assembly being a plurality of second rotary disk assemblies; and
the plurality of first disk assemblies being rotatably connected to the plurality of second rotary disk assemblies.

10. A transmission with alternating rotary disks comprising:
a roller housing;
a first rotary disk assembly;
a second rotary disk assembly;
a drive shaft;
a plurality of mounting shafts;
a reversal shaft;
the roller housing comprising a drive aperture;
the first rotary disk assembly comprising a first rotary element, a plurality of first mounting rollers, and a first rotary driver;
the second rotary disk assembly comprising a second rotary element, a reversal rotary element, plurality of second mounting rollers, and a second rotary driver;
the first rotary element comprising a first rotary aperture and a first mounting surface;
the drive aperture traversing through the roller housing;
the first rotary disk assembly being positioned within the roller housing;
the plurality of mounting shafts being radially distributed about the first rotary disk;
the plurality of mounting shafts being connected within the roller housing;
the plurality of first mounting rollers being rotatably connected to the plurality of mounting shafts;
the plurality of first mounting rollers being rotatably engaged about the first rotary element;
the drive shaft being rotatably connected to the drive aperture;
the drive shaft traversing into the roller housing;
the first rotary driver being torsionally connected to the drive shaft;
the first rotary driver being rotatably engaged to the first rotary element;
the second rotary disk assembly being positioned within the roller housing;
the second rotary disk assembly being positioned adjacent to the first rotary disk assembly;
the plurality of mounting shafts being radially distributed about the second rotary disk;
the plurality of second mounting rollers being rotatably connected to the plurality of mounting shafts;
the plurality of second mounting rollers being rotatably engaged about the second rotary element;
the reversal rotary element being rotatably engaged to the second rotary element, wherein the reversal rotary element is configured to reverse the direction of rotation of the second rotary element relative to the direction of rotation of the first rotary disk assembly;
the reversal shaft being connected within the roller housing;
the reversal rotary element being rotatably connected to the reversal shaft;
the second rotary driver being rotatably engaged to the reversal rotary element;
the second rotary driver being torsionally connected to the drive shaft;
the first rotary aperture traversing through the first rotary element;
the first mounting surface being peripherally positioned along the first rotary apertures;
the first rotary disk assembly being a plurality of first rotary disk assemblies;
the second rotary disk assembly being a plurality of second rotary disk assemblies; and
the plurality of first disk assemblies being rotatably connected to the plurality of second rotary disk assemblies.

11. The transmission with alternating rotary disks as claimed in claim 10 comprising:
the roller housing comprising a first chamber aperture;
the first chamber aperture traversing from the roller housing to the first rotary aperture; and
the first chamber aperture being concentrically aligned with the first rotary aperture.

12. The transmission with alternating rotary disks as claimed in claim 10 comprising:
the second rotary element comprising a second rotary aperture and a second mounting surface; and the second rotary aperture traversing through the second rotary element; and the second mounting surface being peripherally positioned along the second rotary aperture.

13. The transmission with alternating rotary disks as claimed in claim 12 comprising:
the roller housing comprising a second chamber aperture;
the second chamber aperture traversing from the roller housing to the second rotary aperture; and
the second chamber aperture being concentrically aligned with the second rotary aperture.

14. The transmission with alternating rotary disks as claimed in claim 12 comprising:
a rotary insert; and
the rotary insert being connected along the second mounting surface through a mounting element.

15. The transmission with alternating rotary disks as claimed in claim 10 comprising:
a rotary insert; and
the rotary insert being connected along the first mounting surface through a mounting element.

16. The transmission with alternating rotary disks as claimed in claim 10 comprising:
a plurality of roller spacers;
the first rotary element being rotatably connected to the roller housing through one of the plurality of roller spacers; and
the second rotary element being rotatably connected to the first rotary element through the one of the plurality of roller spacers.

\* \* \* \* \*